H. VANDERBEEK.
DRIVING MECHANISM FOR MOTOR VEHICLES.
APPLICATION FILED JUNE 5, 1918.

1,367,642.

Patented Feb. 8, 1921.
3 SHEETS—SHEET 1.

Inventor:
Herbert Vanderbeek,
by Emmett Lamm,
his Attys.

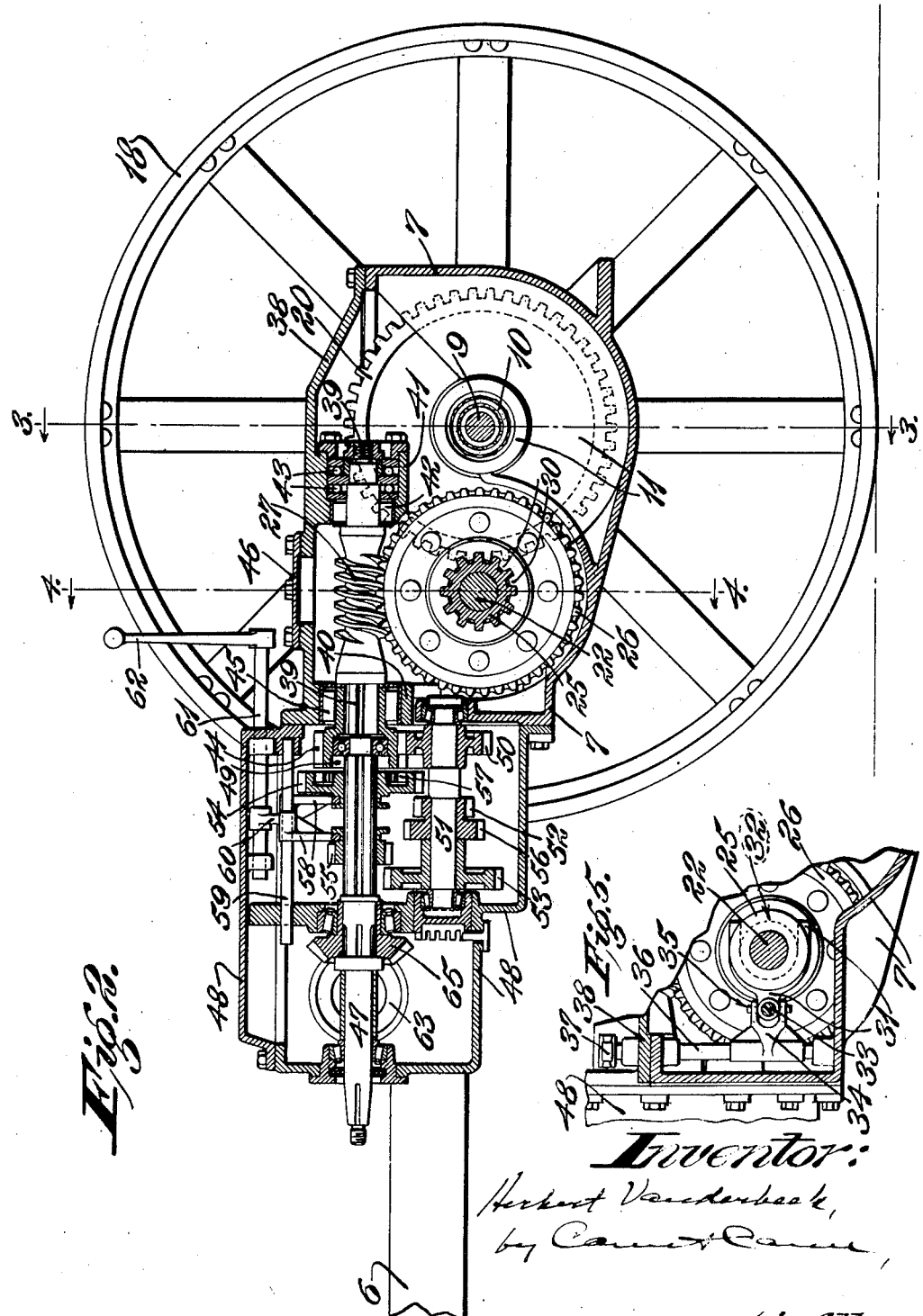

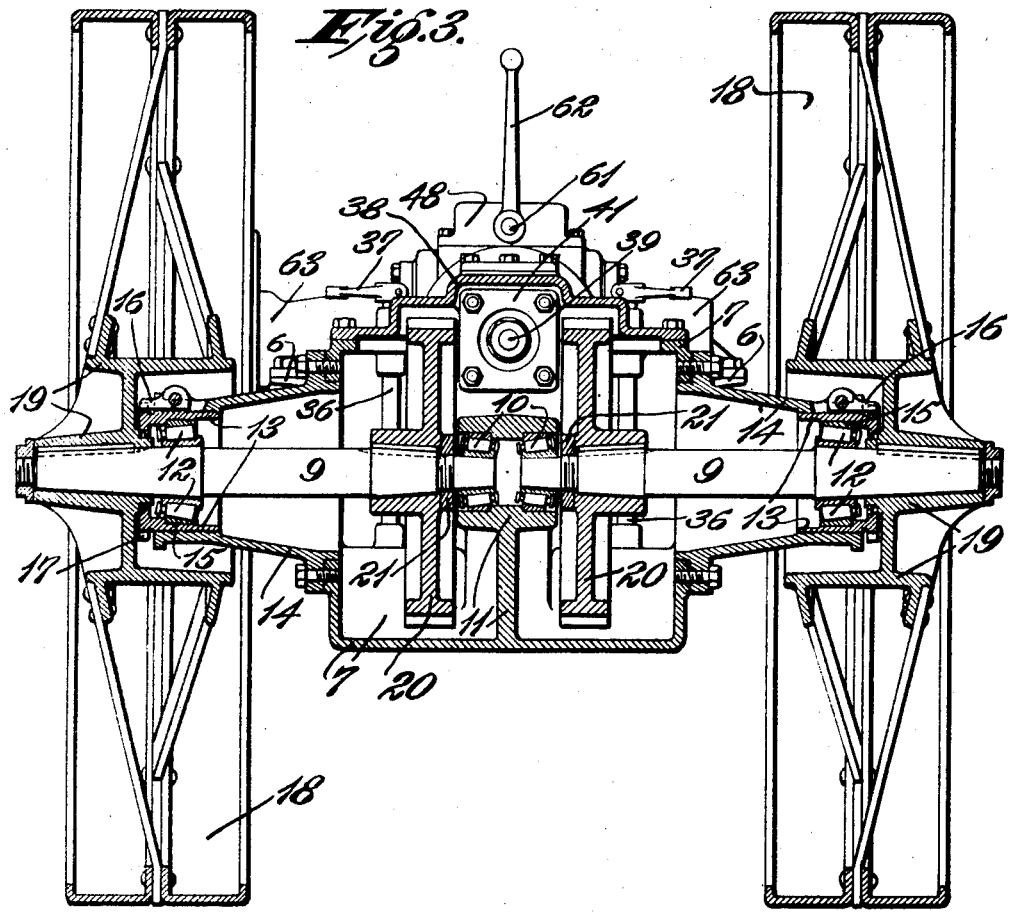
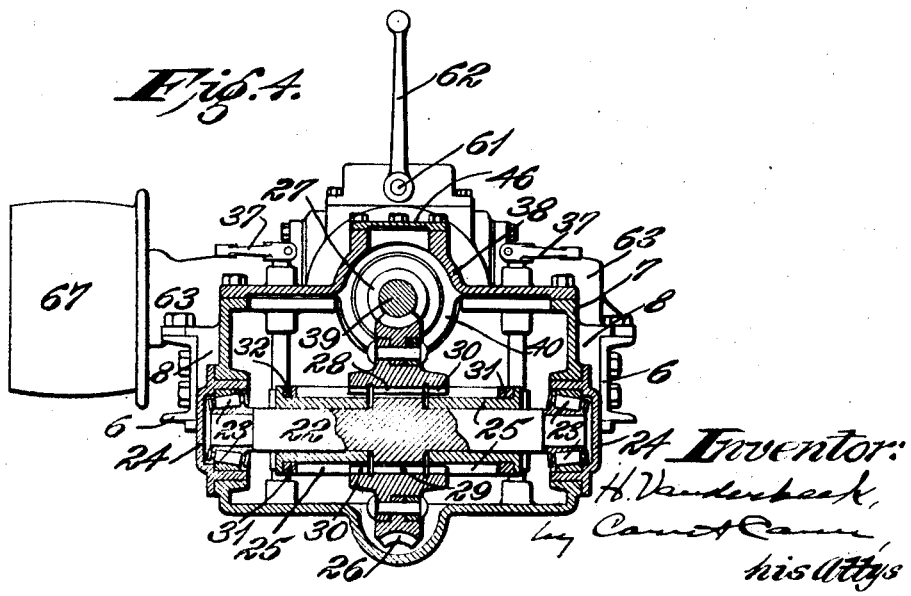

UNITED STATES PATENT OFFICE.

HERBERT VANDERBEEK, OF DETROIT, MICHIGAN, ASSIGNOR TO THE TIMKEN-DETROIT AXLE COMPANY, OF DETROIT, MICHIGAN, A CORPORATION OF OHIO.

DRIVING MECHANISM FOR MOTOR-VEHICLES.

1,367,642.

Specification of Letters Patent.

Patented Feb. 8, 1921.

Application filed June 5, 1918. Serial No. 238,283.

*To all whom it may concern:*

Be it known that I, HERBERT VANDERBEEK, a citizen of the United States, and a resident of the city of Detroit, in the county of Wayne and State of Michigan, have invented a new and useful Improvement in Driving Mechanism for Motor-Vehicles, of which the following is a specification.

This invention relates to the driving mechanism of motor driven vehicles, particularly vehicles of the type known as agricultural tractors. On account of the varying roughness and softness of the ground, one or another of the traction wheels of agricultural tractors is liable to slip. For this reason, it is not practicable to use the type of differential commonly used in connection with the ordinary type of motor driven road vehicles because the ordinary differential would permit the traction wheels to slip and spin, thus greatly reducing the tractive or ground-gripping ability of the traction wheels of the vehicle.

The principal object of the present invention is to provide a tractor, wherein both driving wheels can be positively driven under normal conditions and wherein one or the other of said wheels may be disengaged from the driving mechanism of the tractor by the driver at will thereby transmitting the full driving power to the other driving wheel. Another object is to facilitate making short turns, which is difficult when both drive wheels are being driven at the same speed. Another object is to permit the full driving power to be exerted on the outer drive wheel of the tractor when turning on a short radius, the outer drive wheel being engaged with the driving mechanism and the inner wheel disengaged at such time, thereby facilitating the turning of the vehicle when the steering wheels are placed at the desired angle. Another object is to reduce the cost of manufacture.

The invention consists in a final drive for motor vehicles, wherein the traction wheels of the vehicle are secured to axle sections arranged to be driven independently by the driving mechanism of the vehicle. The invention further consists in means for applying the full driving power to both traction wheels of the vehicle or to one or the other of the traction wheels at will. The invention also consists in the combinations and arrangements of parts hereinafter described and claimed.

In the accompanying drawings, wherein like reference numerals refer to like parts wherever they occur, Figure 1 is a top plan view of a driving mechanism embodying my invention shown in connection with a vehicle frame, the cap for the axle housing being removed, and the transmission and one wheel being shown in section to more clearly illustrate the same;

Fig. 2 is a vertical longitudinal section taken on the line 2—2 in Fig. 1;

Fig. 3 is a vertical transverse section taken through the driving axle on the line 3—3 in Fig. 2;

Fig. 4 is a vertical transverse section taken through the auxiliary shaft on the line 4—4 in Fig. 2; and Fig. 5 is a fragmentary detail section taken on the line 5—5 in Fig. 1 showing the means for operating the sliding pinions on the auxiliary shaft.

Figure 1:
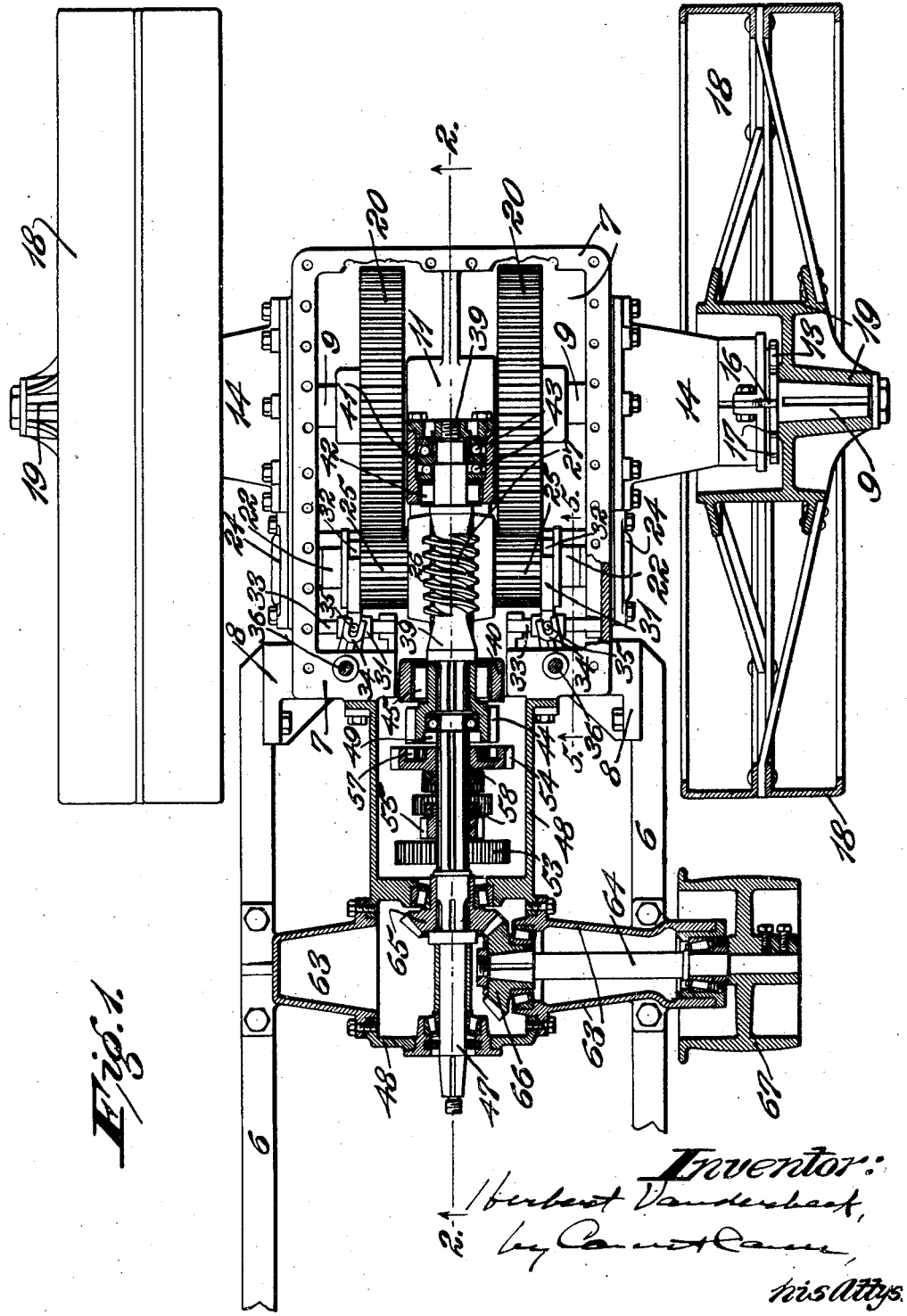

The present construction comprises spaced channel side members 6. Located between the rear end portions of the channel side members is a housing 7, which is provided with a pair of bracket members 8 at its forward end bolted or otherwise secured to the inner faces of the rear ends of the side frame members 6. A pair of driving axle sections 9 arranged in axial alinement have their inner ends spaced apart and are journaled in tapered inner bearings 10 mounted in a pedestal 11 formed in the housing 7. The outer end portions of the axle sections are journaled in outer tapered bearings 12 located in adjusting sleeves 13 which are threaded into tubular nose portions 14 projecting outwardly from each side of the housing 7. These sleeves engage the outer bearing cups 15 of the outer bearings and may be adjusted to take up any wear that may occur in the members. The walls of the tubular nose portions 14 of the housing 7 are split inwardly a short distance from each end and a detent 16 is arranged therein, which engages the adjacent notch of a series 17 formed in the ends of the sleeves. Traction wheels 18 have their hub portions 19 keyed or otherwise secured to the tapered outer end portions of the driving axle sections 9 which project beyond the nose portions 14 of the housing 7. Fixed to the tapered inner end portions of the axle sections and arranged one on each side of the pedestal 11 are large gears 20. Each of these gears is keyed or otherwise secured to its respective axle section, and held in place by means of a nut 21. An auxiliary shaft 22 is arranged parallel with and located forward of the driving axle sections 9 and is also in horizontal alinement with the same. This auxiliary shaft is provided with tapered bearings 23 at each end which are mounted in removable caps 24 bolted or otherwise secured to the side walls of the housing 7. A pair of pinions 25 are slidably mounted on the auxiliary shaft 22 and are arranged to constantly mesh with the large gears 20 fixed to the driving axle sections 9. The auxiliary shaft 22 is driven by a worm driving gear 26 and worm 27 which receives its power from the motor through the transmission, as will be hereinafter more clearly described. The middle portion of the auxiliary or worm gear shaft 22 is provided with teeth or ribs 28, which engage corresponding portions 29 in the hub of the worm gear 26 for rotation thereby. The sliding pinions 25 are located on each side of the worm gear 26 and are adapted to slidably engage internal clutch teeth 30 formed in the opposite sides of the hub portion of the worm gear 26. Each of these pinions 25 may be engaged or disengaged from the worm driving gear independently of each other by means of a sliding fork 31, which engages the grooved hub portion 32 of the sliding pinions. Each of these forks 31 is slidably mounted on a rod 33 mounted in each side at the forward end of the housing 7, and is operated by means of a yoke 34 provided with slotted portions adapted to engage pins 35 carried by the fork 31. The yoke is secured to a vertical shaft 36 stepped in the housing 7 and operated by a lever 37 at the will of the driver in any desired manner. The top portion of the housing 7 is closed by a cover or cap-plate 38, which is bolted or otherwise removably secured in position.

The propeller or worm drive shaft 39 is arranged directly over the worm gear 26 at right angles to the same so as to mesh therewith, and is supported at its front and rear ends by journal-boxes 40 and 41 depending from the under side of the cover plate 38. The rear end of the worm drive shaft 39 is supported on roller bearings 42 and two sets of ball bearings 43 to take up the radial and end thrust, respectively. The forward end of the worm drive shaft is provided with a drive gear 44, the hub portion of which is splined thereto and is supported on roller bearings 45 carried by the journal box 40 depending from the forward end of the cover plate 38. The cover plate is provided with an opening located over the worm for oiling and inspection purposes, and is closed by a plate 46 removably secured to the cover plate.

The transmission can be of any desired type, and consists of the usual transmission shaft 47 arranged in axial alinement with the worm shaft 39, being practically a continuation of the same. The transmission shaft 47 is supported with its forward bearing in the transmission housing 48 and its rear bearing in a pocket 49 formed in the drive gear 44. The forward end of the transmission shaft is shown projecting from the transmission, whereby it can be coupled to the power shaft leading from the motor (not shown) in the usual manner. The drive gear 44 is fixed to the forward end of the worm drive shaft and meshes constantly with the drive gear 50 on the counter-shaft 51 of the transmission gearing. This counter-shaft is also provided with the usual gears 52 and 53 adapted to mesh with the sliding gears 54 and 55 splined on the main transmission shaft for obtaining the different forward speeds. The counter shaft is also provided with the usual reversing gear 56 adapted to mesh with an idler gear (not shown). The sliding gear 54 arranged adjacent to the drive gear 44 of the worm shaft is provided with internal clutch teeth 57, which are adapted to mesh with the driving gear 44 when a direct drive is required. The sliding gears 54 and 55 are operated by means of yokes 58 slidably mounted on rods 59. These yokes are adapted to be independently engaged by an arm or lever 60 secured to a rod 61, which projects from the transmission casing and has a control lever 62 secured to its end. This control mechanism is of the type wherein a guide-plate (not shown) having an H-slot is used in connection with the control lever and permits the control rod to be slid or rocked within suitable limits. The forward end of the transmission housing is provided with oppositely extending tubular portions 63 the ends of which are bolted or otherwise secured to the top surface of the side frame members 6. One of these portions has a short shaft section 64 arranged transversely of the transmission shaft 47 and is driven therefrom by means of bevel gears 65 and 66 keyed to the respective transmission and transverse shafts. The outer end of the transverse shaft 64 projects beyond the side frame and is provided with a belt pulley, 67, which enables the tractor to be used as a stationary engine for operating threshers, grinders, pumps and the like.

Under normal conditions (that is, straightaway work as in pulling plows or other implements) both pinions are in engagement with the driving worm gear, whereby both the driving wheels are positively driven at the same speed. This engagement gives the effect of driving the vehicle as with a solid rear axle, delivering the same amount of power to both traction wheels, the power delivered to one drive wheel not being affected by the slipping of the other.

When the operator desires to turn the tractor, the pinion on the side toward which the turn is to be made is thrown out of engagement with the clutch teeth of the worm driving gear, thus allowing the inner traction wheel to run free and throwing all of the driving power into the outer traction wheel. This, in connection with the placing of the steering wheels at the proper angle facilitates the turning of the tractor and is especially advantageous when a short turn is required. In the event that a turn in the opposite direction is desired, the pinion on the opposite side is withdrawn from engagement with the clutch teeth of the worm driving gear and the other pinion is coupled to the worm driving gear, and the turning direction of the machine reversed until the turn is completed and the operator again desires to travel in a straight course.

The foregoing arrangement is considered only as an example and as the one best adapted to the type of driving mechanism and tractor shown, but the invention is not limited thereto, and the exact details for connecting or disconnecting either traction wheel from the driving mechanism may be modified without departing from the invention. The transmission is shown and described only as a suitable type and I do not wish to be limited thereto, as my invention is equally applicable for use in connection with transmissions of various types.

What I claim as my invention and desire to secure by Letters Patent is:

1. In a motor vehicle, a housing secured to the frame of said vehicle and having an opening therein, a cover for closing said opening, axle sections mounted on bearings in said housing and having traction wheels keyed to their outer ends, gears secured to the inner ends of said axle sections, an auxiliary shaft mounted on bearings in caps removably secured to said housing and having pinions loosely mounted thereon constantly in mesh with the gears of the axle sections, a worm driving gear mounted on said auxiliary shaft and adapted to be coupled with said pinions, a worm meshing with said driving gear for driving the same, said worm being mounted in bearings in the removable cover of the housing whereby said worm and said cover are removable as a unit.

2. In a motor vehicle, a housing secured to the frame of the vehicle having alined tubular portions projecting from the side walls thereof, a journal box in said housing midway between and in alinement with said tubular portions, axle sections mounted in bearings in the tubular portion and the journal box of said housing, the outer ends of said axle sections projecting from said tubular portion and having traction wheels keyed thereto, gears fixed to the axle sections, an auxiliary shaft mounted in said housing having pinions slidably arranged thereon and meshing with the gears of the axle sections, a worm gear on said shaft, a worm meshing with said worm gear, and means for coupling said pinions with the worm gear at the will of the operator.

3. A motor vehicle comprising independent axle sections having traction wheels secured thereto, gears fixed to said axle sections, an auxiliary shaft having pinions meshing with the gears of the axle sections and loosely arranged thereon, a worm driving gear on said shaft adapted to be clutched by said pinions, means for clutching said pinions with the worm gear, a worm for driving said worm gear, a housing secured to the vehicle frame inclosing the axle sections, the gears, the auxiliary shaft, the pinions and worm wheel therein, transmission gearing inclosed in said housing and connected to the worm for driving the same, the portion of the housing inclosing the transmission gearing being provided with oppositely extended portions which are secured to the side members of the vehicle frame.

4. A motor vehicle comprising traction wheels keyed to independent axle sections, gears fixed to said axle sections, an auxiliary shaft having grooved clutch pinions meshing with the gears of said axle sections and loosely arranged thereon, a worm driving gear on said shaft having clutch teeth adapted to receive teeth of the clutch pinions, a worm for driving said gear, a housing inclosing the axle sections and the gears thereon, the auxiliary shaft, the clutch pinions, the worm driving gear and the worm for driving the same, and means whereby each grooved clutch pinion may be clutched with the worm driving gear independently of each other, said means comprising a rod mounted horizontally in the housing and having a yoke slidably mounted thereon, said yoke engaging the groove in the clutch pinion, and a vertical shaft having an arm connected to said yoke, said shaft being rotatably mounted in the housing and being provided with a lever for operating the same.

5. In a motor vehicle, a housing secured to the frame of said vehicle, axle sections mounted in bearings in said housing and having traction wheels keyed to their outer ends, gears secured to the inner ends of said axle sections, an auxiliary shaft journaled in said housing and having pinions loosely mounted thereon continuously in mesh with the gears of said axle sections, a driving gear mounted on said auxiliary shaft and adapted to be coupled with said pinions at will, a gear in said housing for driving said driving gear, said auxiliary shaft being journaled in bearings removably secured to said housing whereby said auxiliary shaft is removable endwise from said housing.

6. In a motor vehicle, a housing secured to the frame of said vehicle and having an opening therein, a cover for closing said opening, axle sections journaled in said housing and having traction wheels secured to their outer ends, gears secured to the inner ends of said axle sections, an auxiliary shaft journaled in said housing and having pinions loosely mounted thereon constantly in mesh with the gears of said axle sections, a driving gear mounted on said auxiliary shaft and adapted to be coupled with said pinions, a drive gear meshing with said driving gear for driving the same, said drive gear being journaled in the removable cover of the housing whereby said drive gear and said cover are removable as a unit.

7. A driving unit for a motor vehicle, said unit comprising a housing adapted to be attached to the frame members of said vehicle, alined axle sections journaled in said housing and having traction wheels secured thereto for supporting said housing, drive gearing inclosed in said housing and adapted to be coupled to the power shaft of said motor vehicle for driving the traction wheels which support said mobile unit, transmission gearing in said housing operatively connected to said drive gearing, said housing extending between the spaced side frame members of the vehicle and having oppositely extending tubular portions adapted to be supported on and secured to the adjacent side frame member, and a shaft journaled in one of said oppositely extending tubular portions of said housing, said shaft being operatively connected to the transmission gearing and having a power pulley mounted on its outer end.

8. In a motor vehicle, a housing secured to the frame of said vehicle, alined axle sections mounted in said housing and having traction wheels fixed to their outer ends, gears fixed to the axle sections, an auxiliary shaft mounted in said housing having pinions loosely arranged thereon and continuously in mesh with the gears of the axle sections, a worm gear fixed to said shaft, a worm mounted in said housing and extending longitudinally of said vehicle and meshing with said worm gear, and means for coupling said pinions with the worm gear at the will of the operator.

9. In a motor vehicle, a housing secured to the frame of the vehicle, separate driving axle sections rotatably mounted in said housing, said axle sections having wheels secured to their outer ends and gears at their inner ends, an auxiliary shaft mounted in the housing and removable endwise therefrom, clutch pinions meshing with the gears of the axle sections loosely sleeved thereon, a worm driving gear splined on said shaft to permit the shaft to be removed endwise, a driving shaft disposed longitudinally of said vehicle and having a worm arranged to coöperate with said worm gear, and having internal clutch teeth formed in its opposite sides adapted to receive the teeth of the clutch pinions, and means for engaging said pinions with the internal clutch teeth of the worm driving gear at the will of the operator.

Signed at Detroit, Michigan, this 29 day of May, 1918.

HERBERT VANDERBEEK.